United States Patent [19]

Oliver

[11] 4,234,049
[45] Nov. 18, 1980

[54] MASS MEASURING APPARATUS

[76] Inventor: George A. Oliver, P.O. Box 27096, Benrose 2011, Johannesburg, South Africa

[21] Appl. No.: 935,884

[22] Filed: Aug. 23, 1978

[30] Foreign Application Priority Data

Aug. 23, 1977 [ZA] South Africa ............... 77/5085

[51] Int. Cl.² .......................................... G01G 13/00
[52] U.S. Cl. ................................ 177/105; 177/229; 177/255
[58] Field of Search .................. 177/105–114, 177/229, 255, 211; 338/6

[56] References Cited

U.S. PATENT DOCUMENTS

| 3,074,175 | 1/1963 | Ludlam | 338/6 X |
| 3,478,618 | 11/1969 | Provi | 177/257 X |
| 3,966,000 | 6/1976 | Allen | 177/1 |
| 3,993,149 | 11/1976 | Harvey | 177/163 |

FOREIGN PATENT DOCUMENTS 2136586  9/1972  Fed. Rep. of Germany ........... 177/255

Primary Examiner—Joseph W. Hartary
Attorney, Agent, or Firm—Murray and Whisenhunt

[57] ABSTRACT

A mass measuring apparatus having a hopper adapted to receive matter the mass of which is to be weighed and having a discharge at its lower end, a load sensing device, and a linkage operatively connected to the load sensing device so that the latter is stressed in accordance with the mass of the hopper and its contents. The linkage applies a force in the horizontal direction to the load sensing device. The hopper is connected by linkage means which are inclined to the vertical.

4 Claims, 3 Drawing Figures

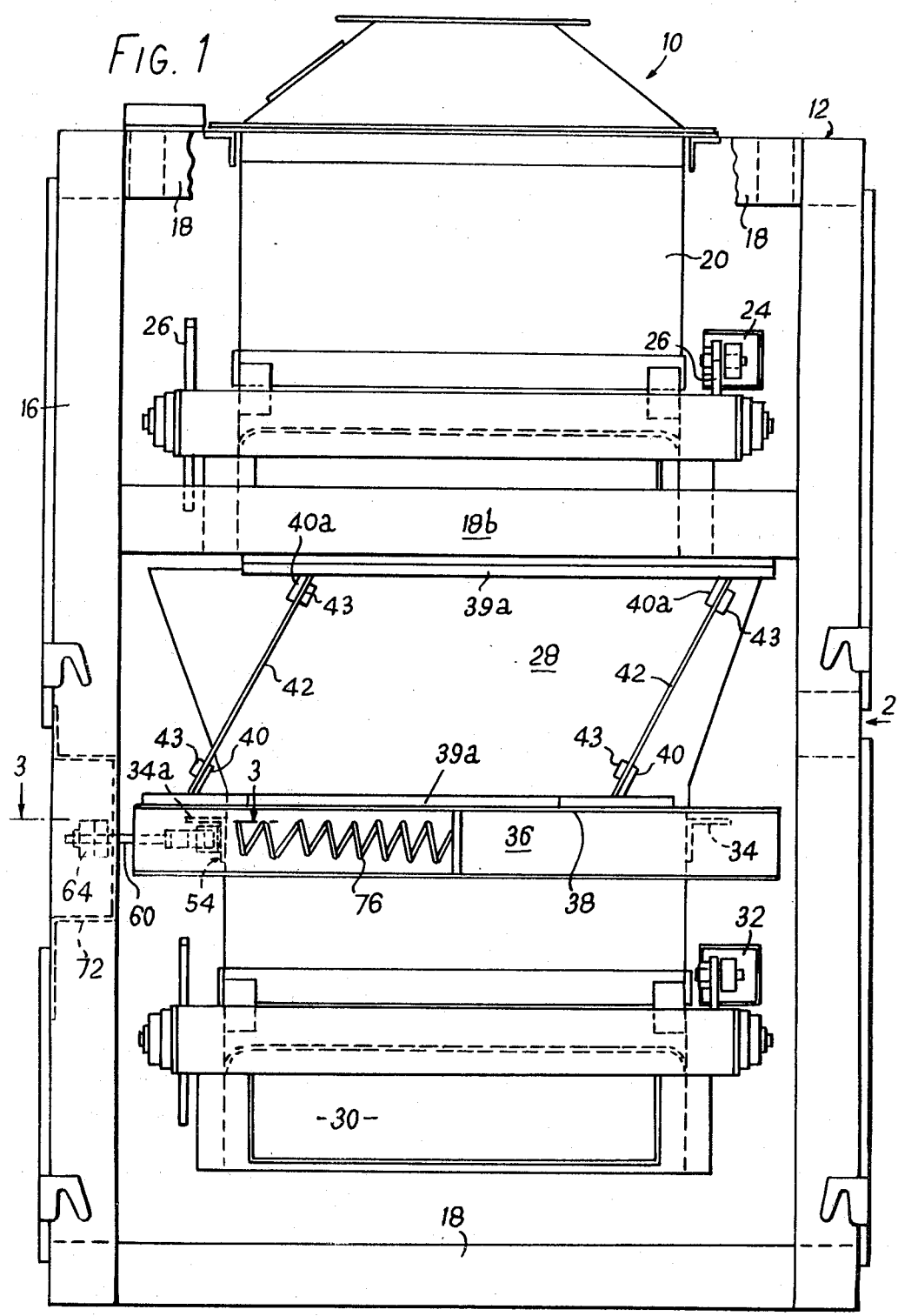

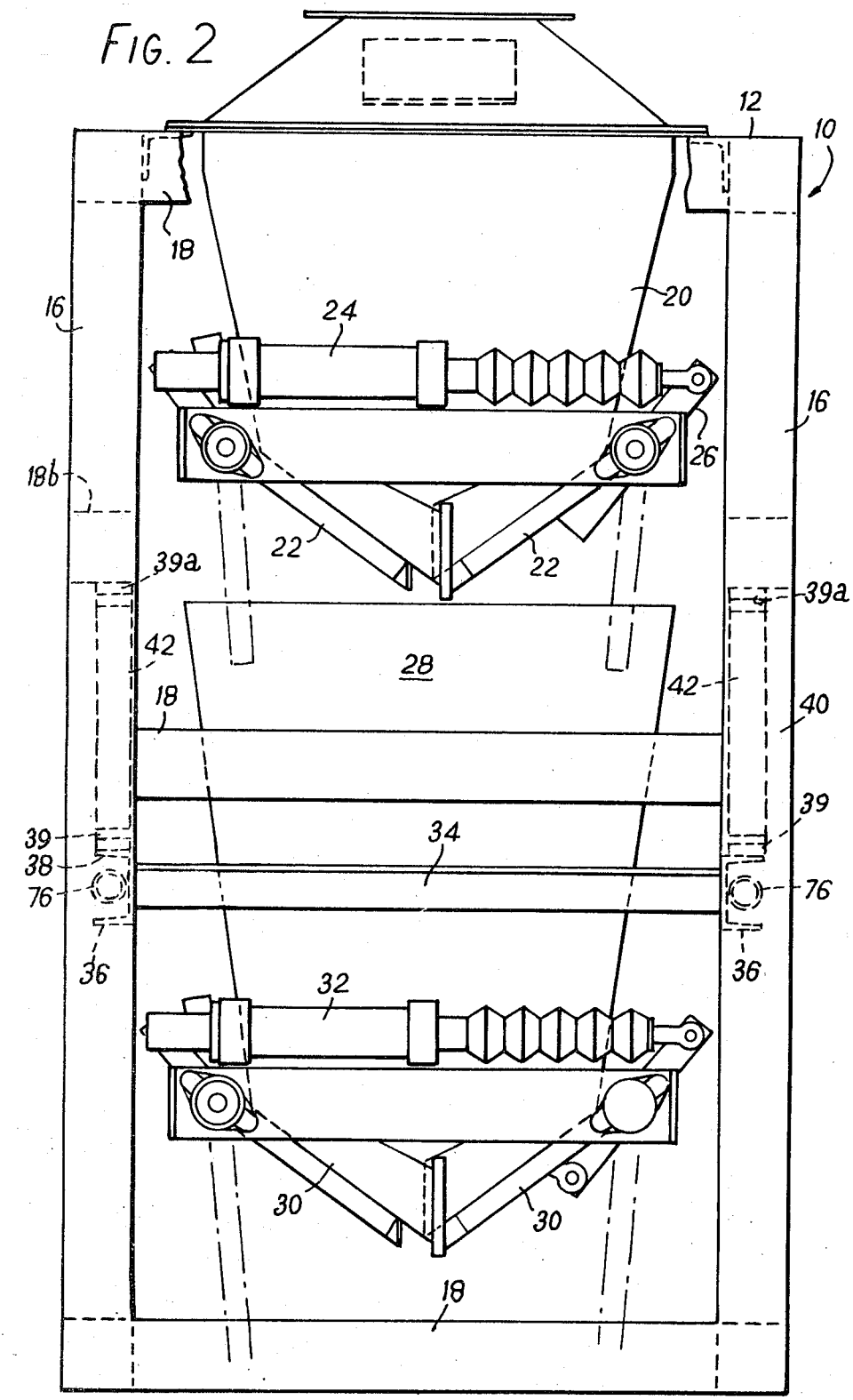

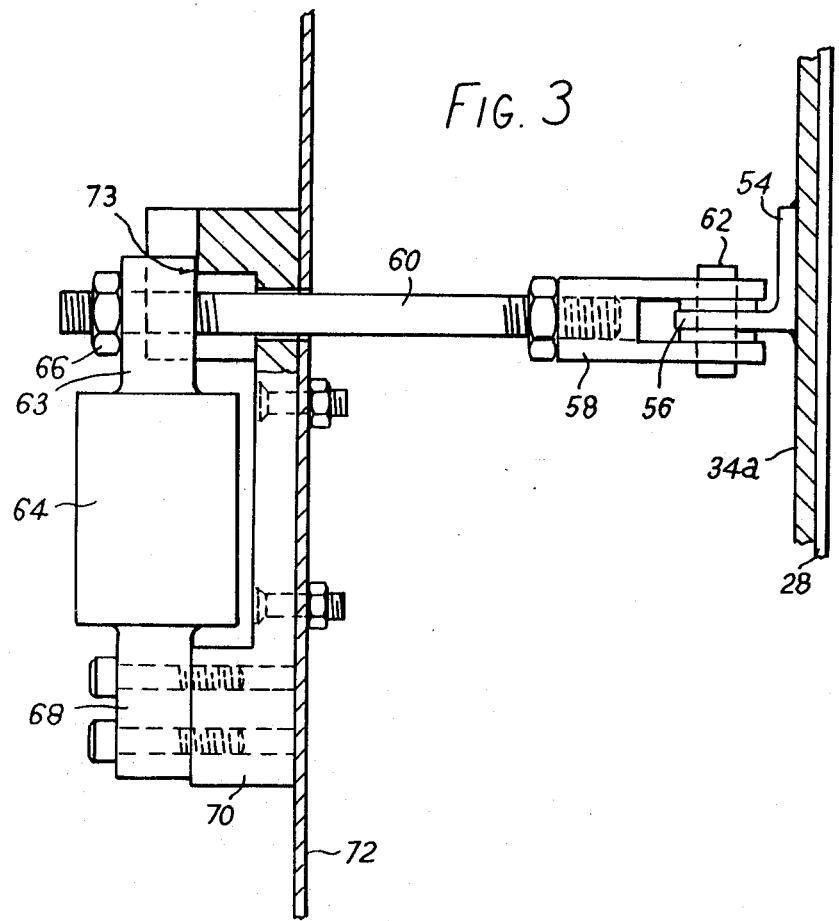

MASS MEASURING APPARATUS

This invention relates to mass measuring apparatus.

This invention is concerned with mass measuring apparatus of the kind comprising a hopper adapted to receive matter the mass of which is to be weighed and having a discharge at its lower end, a load sensing device and a linkage operatively connected to a load sensing device so that the latter be stressed in accordance with the mass of the hopper and its contents. Such a mass measuring apparatus is hereinafter referred to as a meansuring apparatus of the kind set forth.

In one measuring apparatus of the kind set forth the linkage includes a lever which has one end operatively connected to the hopper and the other connected to load sensing device. In another measuring apparatus using load sensing devices, the hopper is provided with a pair of ears which rest on a pair of load sensing devices. Both the above systems have disadvantages, the former in that a fairly substantial amount of sapce is required and the latter in that it requires more than one load sensing device which can be an extremely expensive item.

According to aspect of the present invention there is provided a measuring apparatus of the kind set forth wherein the linkage comprises a member adapted to apply a force in a horizontal direction to the load sensing device and linkage means connecting a hopper to the said member, which linkage means are inclined to the vertical. The linkage means are preferably inclined to the vertical by an acute angle so that the horizontal force transmitted by the said member is less than the mass of the hopper. The angle is preferably between about 40° and 10°, preferably between about 35° and 15° and preferably about 18°.

The link means preferably comprises thin metal link connected flexure means or leaf springs being connected between a fixed member and the said horizontal member. This horizontal member is preferably connected to the hopper by transverse members secured to the hopper.

The measuring apparatus preferably comprises a receiving hopper located above the weighing hopper to receive material the mass of which is to be measured from dumper means, conveyors or the like and to be open periodically to fill the weighing hopper.

An embodiment of the invention will now be described by way of example with reference to the accompanying drawings.

In the drawings:

FIG. 1 is an end view of a mass measuring apparatus of the invention,

FIG. 2 is a side view of the said apparatus, and

FIG. 3 is a detail of the connections to a load sensing device.

Referring now to the drawings there is provided a mass measuring apparatus 10 of the invention comprising a main rigid frame 12 of rectangular section and comprising a rigid vertical and horizontal members 16 and 18 respectively.

Mounted on the upper horizontal members 18 is a receiving hopper 20 provided with bottom discharge "bomb doors" 22 operable by means of a pneumatic jack 24 acting through suitable links 26 connected to the bomb doors 22.

Located below the receiving hopper 20 is a rectangular section weighing hopper 28 which is also provided with bottom opening "bomb doors" 30. These "bomb doors" 30 are operated by a pneumatic jack 32 in much the same way as the bomb doors 22.

The weighing hopper 28 has welded to it a pair of horizontal angle members 34 which extend transversely of the weighing hopper. At the ends these angle mambers 34 are welded to a pair of channel members 36 which extend over approximately 90% of the width of the frame 12 and are located between a pair of vertical members 16 as is apparant from FIG. 2.

Each channel member 36 has on its upper flange 38 a support plate 39 on which are formed inclined support arms 40. The plate 39 has elongated holes (not shown) therethrough and bolts pass through these holes and holes in the flange 38. A similar plate 39a, having identical arms 40a are bolted in an inverted position to a horizontal member 18b of the frame 12 located one above each of the channel members 36. The nearest pairs of support arms 40 are connected together by flexure means comprising stainless steel leaves 42 which are from 25 mm to 40 mm wide and approximately 1 mm thick. The ends of each leaf is attached to the arms on plates 39 and 39a as shown, being clamped by a member 43 bolted to the arms and passing through the end of the leaf. Dowel pins (not shown) also pass through the plates, arms and leaf ends to prevent the leaf springs from moving in their planes.

The arms 40 of plate 39, are off-set relative to and on the opposite side to the arms 40a so that each leaf spring 42 lies at an angle to the verticals. This angle is an acute angle which is conveniently about 20°.

By use of the elongated slots abovementioned in the plates 39 and 39a, all four leaves 42 can be arranged to lie in the exactly same angle. More precise calibration is effected by placing shims between the arms 40, 40a or the clamping member 43 and the leaf spring ends. It will be seen therefore that the weighing hopper 28 is supported from the cross-beams 18b by the four leaves 42. Further leaves 42 will prevent the hopper 28 moving transversely to their length, i.e. the hopper 28 will not be able to move other than permitted by the flexure of the leaves and then only to the extent which will be permitted by a link arrangement 52 shown in FIG. 3.

This link arrangement 52 will now be described.

Welded centrally to one of the angle members 34 is one arm of a shorter angle member 54 (see FIG. 3) the other arm 56 whereof constitutes a lug. A shackle 58 on one end of the draw bolt 60 engages this lug 56 and is connected thereto by means of a pin 62 passing therethrough. The other end of the draw bar 60 passes through an arm of a load cell 64 and is held in position by a nut 66. The other arm 68 of the load cell 64 is bolted to a support structure 70 carried on a box frame 72 which is bolted to the frame 12. The support structure 70 has a shoulder 73 located under the arm 68 to limit movement thereof and hence the flexure of the load cell. Such movement may be limited to 0.3 mm (depending upon the construction of the load cell) so that the cell will be protected against damage due to over-flexure.

The adjustment of the load cell 64 will be known to those skilled in this art as is its connection to suitable electronic display or print-out means.

It will be seen that the component of horizontal force transmitted by the links 44 to the channel members 36 is related to the angle of the leaf springs 42 and, in view of the angle chosen, is a very small proportion of the force which is applied due to the mass of the hopper 28 and any contents therein. This provides a very satisfactory mass measuring means for measuring the mass of the contents of the hopper 28.

Heavy springs 76 are provided on each side of the hopper 28 to counter the tare mass weight of the hopper and the parts moving therewith.

It will be appreciated that extraneous movement of the hopper is eliminated as far as possible and any movement of the hopper in a direction at right angles to the leaf springs 42 is virtually wholly eliminated.

The measuring apparatus 10 operates as follows: The receiving hopper 20 receives matter the mass of which is measured either from dump means, a conveyor or the like. When sufficient of this material is received the bomb doors 22 are opened and the contents of the receiving hopper 20 are deposited in the weighing hopper 28. When the latter has been charged and the contents settled, a reading is taken off the load cell 64. The bomb doors 30 are now opened and the contents discharged. After discharge the mass of the weighing hopper 28 is measured giving the tare mass of the hopper. Consequently the mass of the material which was passed therethrough can be calculated.

The hopper 28 which weighs approximately is adapted to weigh batches of from 100 kg to 500 kg. The measuring apparatus 10 will be relatively small having an overall height of approximately 1.5 meters.

Because the movement of the hopper is so closely restrained, the measuring apparatus 10 is extremely stable with a low stabilizing time. This means that it can operate very quickly indeed as there is no need to allow the hopper 28 lengthy time to settle its movement after charging and discharging as occurs in conventional mass measuring equipment.

It will be noted from the above that the calibration of the measuring device is quick and economical.

I have found that the mass measuring apparatus above described is accurate and robust. It requires only a single load cell 64 and the range which must be covered by this cell is minimised because of the low horizontal component force which it must measure. The elimination of additional load cells and complicated linkage makes the device extremely economical to manufacture. Further the arrangement of the entire mass measuring device is compact with the load cell well protected. Additional protection can be easily provided.

Because there are no moving parts maintenance too is kept to a minimum.

This invention is not limited to the precise constructional details hereinbefore described and illustrated in the drawings being limited only by the spirit and scope of the annexed claim.

I claim:

1. A mass measuring apparatus comprising:
   (a) a frame, including a plurality of cross-members;
   (b) a hopper located within the frame and being adapted to receive matter the mass of which is to be measured and having closable discharge means at its lower end to discharge matter the mass of which has been measured;
   (c) at least four pairs of attachment members secured one of each pair to the frame and the other of each pair to the hopper;
   (d) at least four leaf springs extending between and being connected to the said pairs of attachment members respectively, the leaf springs being arranged in parallel disposition inclined to the vertical and the connection between each leaf spring and the attachment members being a two point connection so that the leaf spring cannot swing in its plane;
   (e) a load cell operatively carried by the frame; and
   (f) a horizontal link operatively connecting the hopper to the load cell.

2. Apparatus as claimed in claim 1 in which the connection includes a bolt and a dowel pin passing through the leaf spring end.

3. Apparatus as claimed in claim 1 in which the each said member has a flat surface to which the leaf spring end is clamped.

4. A mass measuring apparatus comprising:
   (a) a frame, including a plurality of cross-members;
   (b) a hopper located within the frame and being adapted to receive matter the mass of which is to be measured and having closable discharge means at its lower end to discharge matter the mass of which has been measured;
   (c) at least four leaf springs extending between and operatively connecting the cross-members and the hopper, the leaf springs being arranged in parallel disposition inclined to the vertical;
   (d) a load cell;
   (e) a horizontal link operatively connected to the hopper;
   (f) a first arm secured at one end to the load cell and being operatively connected at the other end to the frame;
   (g) a second arm secured at one end to the load cell and being operatively connected at the other end to the hopper.

* * * * *